US006753535B2

(12) United States Patent
Rose

(10) Patent No.: US 6,753,535 B2
(45) Date of Patent: Jun. 22, 2004

(54) ARTICLE IRRADIATION SYSTEM WITH MULTIPLE BEAM PATHS

(75) Inventor: Graham Thomas Rose, Ottawa (CA)

(73) Assignee: Ion Beam Applications, S.A., Louvain-la Neuve (BE)

( * ) Notice: Subject to any disclaimer, the term of this patent is extended or adjusted under 35 U.S.C. 154(b) by 0 days.

(21) Appl. No.: 10/429,706

(22) Filed: May 6, 2003

(65) Prior Publication Data

US 2003/0201400 A1 Oct. 30, 2003

Related U.S. Application Data

(62) Division of application No. 09/987,966, filed on Nov. 16, 2001, now Pat. No. 6,583,423.

(51) Int. Cl.[7] ........................................ G01N 21/00

(52) U.S. Cl. ........................ 250/453.11; 250/454.11; 378/69

(58) Field of Search .................... 250/453.11, 454.11, 250/455.11; 378/64, 68, 69

(56) References Cited

U.S. PATENT DOCUMENTS

| | | | |
|---|---|---|---|
| 924,248 | A | 6/1909 | Lazear |
| 1,809,078 | A | 6/1931 | Smith |
| 2,095,502 | A | 10/1937 | Johnston |
| 2,602,751 | A | 7/1952 | Robinson |
| 2,741,704 | A | 4/1956 | Trump et al. |

(List continued on next page.)

FOREIGN PATENT DOCUMENTS

| | | | |
|---|---|---|---|
| GB | 1 385 733 | A | 2/1975 |
| WO | WO 99 40803 | A | 8/1999 |
| WO | WO 01 00249 | A | 1/2001 |

OTHER PUBLICATIONS

L.V. Spencer, Energy Dissipation by Fast Electrons, 1959, National Bureau of Standards Monograph 1, US Dept. of Commerce, National Bureau of Standards, pp 1–70.

ASTM Designation:L E1608–00, Stadard Practice for Dosimetry in an X–Ray (Bremsstralung) Facility for Radiation Processing. Annual Book of ASTM Standards, American Society for Testing and Materials, Conshohocken, PA 19428.

H.W. Koch et al., Electron Accelerators for Food Processing, 1965, Radiation Preservation of Foods, National Academy of Science–National Research Council Publication 1273, pp 149–73.

K.H. Morganstern, S–Ray Radiation Sources, 1964, Presented at the American Nuclear Society Seminar on the Radiation Processing Industry, Washington, DC.

J.P. Farrell, Trhe Bremsstrahlung Radiation Field of a Scanned Monoenergetic Electron Beamn, 1966, Presented at the International Nuclear Industries Fair, Nuclex 66, Basle, Switzerland.

(List continued on next page.)

*Primary Examiner*—John R. Lee
*Assistant Examiner*—Paul M. Gurzo
(74) *Attorney, Agent, or Firm*—Dorsey & Whitney LLP

(57) ABSTRACT

A system for irradiating articles is disclosed. The system has multiple beam paths and is capable of irradiating articles with x-rays or electron beams (e-beams). The system is comprised of a single radiation source producing multiple beam paths. At least one of the beam paths is configured to irradiate articles with x-rays and at least one other beam path is configured to irradiate articles with e-beams. The beam paths are each positioned to scan product carried on conveyors. The x-ray beam paths and e-beam have separate conveyor systems that operates independently from each other.°

11 Claims, 14 Drawing Sheets

U.S. PATENT DOCUMENTS

| | | | | |
|---|---|---|---|---|
| 2,887,583 A | | 5/1959 | Emauelson | |
| 2,897,365 A | | 7/1959 | Dewey II et al. | 250/49.5 |
| 2,989,735 A | | 6/1961 | Gumpertz | |
| 3,087,598 A | | 4/1963 | Clore | 198/38 |
| 3,224,562 A | | 12/1965 | Bailey et al. | 198/131 |
| 3,261,140 A | | 7/1966 | Long et al. | 53/22 |
| 3,452,195 A | | 6/1969 | Brunner | 250/52 |
| 3,564,241 A | | 2/1971 | Ludwig | 250/52 |
| 3,676,675 A | | 7/1972 | Ransohoff et al. | 250/52 |
| 3,833,814 A | | 9/1974 | Nablo | 250/492 |
| 3,901,807 A | | 8/1975 | Trump | 210/198 |
| 3,915,284 A | | 10/1975 | Knockeart et al. | 198/34 |
| 4,020,354 A | | 4/1977 | Fauss et al. | 250/492 B |
| 4,075,496 A | | 2/1978 | Uehara | 250/492 B |
| 4,166,673 A | | 9/1979 | Dona | 350/97 |
| 4,295,048 A | | 10/1981 | Cleland et al. | |
| 4,481,654 A | | 11/1984 | Daniels et al. | 378/110 |
| 4,514,963 A | | 5/1985 | Bruno | 53/493 |
| 4,561,358 A | | 12/1985 | Burgess | 104/89 |
| 4,653,630 A | | 3/1987 | Bravin | 198/460 |
| 4,690,751 A | | 9/1987 | Umiker | 209/3.3 |
| 4,839,485 A | | 6/1989 | Koch et al. | 219/10.55 |
| 4,852,138 A | | 7/1989 | Bergeret et al. | 378/69 |
| 4,978,501 A | | 12/1990 | Diprose et al. | 422/22 |
| 5,038,911 A | | 8/1991 | Doane et al. | 198/357 |
| 5,096,553 A | | 3/1992 | Ross et al. | 204/157.15 |
| 5,137,139 A | | 8/1992 | Ruscello | 198/460 |
| 5,341,915 A | | 8/1994 | Cordia et al. | 198/460 |
| 5,341,916 A | | 8/1994 | Doane et al. | 198/460 |
| 5,396,074 A | * | 3/1995 | Peck et al. | 250/453.11 |
| 5,400,382 A | | 3/1995 | Welt et al. | |
| 5,590,602 A | | 1/1997 | Peck et al. | |
| 6,215,847 B1 | | 4/2001 | Perrins et al. | |
| 6,468,471 B1 | | 10/2002 | Loda et al. | 422/22 |
| 6,492,645 B1 | * | 12/2002 | Allen et al. | 250/453.11 |
| 6,583,423 B2 | | 6/2003 | Rose | 250/453.11 |

OTHER PUBLICATIONS

K.H. Morganstern, Appraisal of the Advantages and Disadvantages of Gamme, Electron and X–Ray Radiation Sterilization, 1974, Presented at the Symposium on Ionizing Radiation for Sterilization of Medical Products and Bilogical Tissues, Bombay, India, IAEA–SM 192/8, International Atomic Energy Agency, Vienna, Austria.

J. Paul Farrell, High–Power Bremsstrahlung Sources for Radiation Sterilization, 1979, Radiation Physics and Chemistry, vol. 14, Nos. 3–6, 377–387.

J. Paul Farrell, Examination of Product Throughout Obtained From High Power Bremsstrahlung Sources, 1981, IEEE Transaction of Nuclear Science, vol. NS–28, No. 2, pp. 1786–1793.

Stephen M. Selzer et al., Bremsstrahlung Beams from High–Power Electron Accelerators for use in Radiation Processing, 1983, IEEE Transactions of Nuclear Science, vol. NS–30, No. 2, pp. 1629–1633.

J. Paul Farrel et al., Bremmstrahlung Generators for Radiation Processing, 1983, Radiation Physics and Chemistry, vol. 22, No. 3–5, pp. 469–475.

Michael S. DeWilton, High Power, High Reliability Electron Accelerators for Industrial Processing, 1984, Radiation Physics and Chmistry, vol. 25, No. 25, Nos. 4–6, pp. 643–652.

C.C. Thompson and M.R. Cleland, High–Power Dynamitron Accelerators for X–Ray Processing, 1989, Nuclear Instrument and Methods in Physics Research, B40/41, pp. 1137–1141.

M.R. Cleland et al., Advances in X–Ray Processing Technology, 1990, Radiation Physics and Chemistry, vol. 35, No., 4–6, pp. 632–637.

M.R. Cleland et al., Evaluation of new X–Ray Processing Facility, 1991, Nuclear Instruments and Methods in Physics Research, B56/57, pp. 1242–1245.

M.R. Cleland, X–Ray Processing A Review of the Status and Prospects, 1993, Radiation Physics and Chemistry, vol. 42, Nos. 1–3, pp. 499–503.

M.R. Cleland et al., Comparisons of X–Ray and Gamma–Ray Souces for industrial Irradiation Process, 1987, Nuclear Instruments and Methods in Physics Research B24/25, pp. 967–972.

J. Meissner et al,, X–Ray Treatment at MeV and Above, 2000, Radiation Physics and Chemistry, vol. 57, Nos. 3–6, pp. 6547–651.

Y. Aikawa, A New Facility for X–Ray Irradiation and its Application, 2000, Radiation Physics and Chemistry, vol. 57, No. 3–6, pp. 609–612.

T. Watanabe, Best Use of High–Voltage, High–Powered Electron Beams:L A New Approach to Contract Irradiation Services, 2000, Radiation Physics and Chemistry, vol. 57, Nos. 3–6, pp. 635–639.

C. Artandie et al, Electron–Beam Sterilization of Surgical Sutures, Marhch 1959, Nucleonics, vol. 17, Nos. 3, pp. 86–90.

A. Brynjolfsson, Electron Irradiation Facility at the Dsanish Atomic Energy Commission Research Establishment, Riso, 1962, Ingenieren, vol. 6, No. 3, p0p. 101–104.

A. Brynjolfsson, Three–Dimensional Dose Distribution in Samples Irradiated by Electron Beams, 1963, Proceedings of the International Conference on Radiation Research, Held at the US Army Natick Laboratories, Published by the U.S. Dept. of Commerce, Office of Technical Services, pp. 116–129.

A. Brynjolfsson et al., Industrial Sterilization at the Electron Linear, 1963, Accelerator Facility at Risoe, Industrial Use of Large Radiation Sources STI/PUB/75, IAEA, Vienne.

E.M. Fielden et al., Dosimetry in Acclerator Research and Processing 1970, Manual on Radiation Dosimetry, Chapter X, pp. 261–309.

P. Icre, Electronic Radiation Sterilization: Description and Operation of an Industrial Sterilization Unit, 1972, Industries Alomiques & Spatiales, vol. 5.

V.B. Osipov et al., Commercial Units for Radiation Sterilizing Medical Su0pplies, 1974, Multiscience Publication Limited, Montreal, Quebex, Canada, pp. 136–144.

C.W. Rees et al., Electron Irradiation in the Sterilization of Meat, 1976, First International Congress on Engi8neering and Food, pp. 3–25.

J.H. Bly, Electron Beam Sterilization Technology, 91979, Radiation Physics and Chemistry, vol. 143, Nos. 3–6, pp. 403–414.

T.G. Henry, Electron Beam A Cast History, 1990, Radiation Physics and Chemistry, vol. 35, Nos. 4–6, pp. 528–533.

M.R. Cleland et al., Sterilization with Accelerated Electrons, 1993, Sterilization Technology, Chapter 9, pp. 218–253.

T. Sadat, Dual Linear Accelerator System for use in Sterilization of Medical Disposable Supplies, 1991, Nuclear Instruments and Methods in Physics Research, vols. B56/57, Part II, pp. 1226–1228.

ASTM E1321–91, Standard Practice for Dosimetry in Electron and Bremsstrahlung Tradiation Facilities for Food Processing, 1991.

AAMI/American National Standard: Guideline for Electron Beam Radiation Sterilization of Medical Devices, 1991.
T. Sadat, Dual Linear Accelerator System for use in Sterilization of Medical Disposable Supplies, 1991, Nuclear Instruments and Methods in Physics Research, vols. B56/57, Part II, pp. 1226–1228.
ASTM E1321–91, Standard Practice for Dosimetry in Electron and Bremsstrahlung Irradiation Facilities for Food Processing, 1991.
AAMI/American National Standard: Guideline for Electron Beam Radiation Sterilization of Medical Devices, 1991.
Encyclopedia of Pharmaceutical Technology, 1992.
CH2M Hill, Conceptual Design Report–Florida Agricultural Commodities Irradiator Demonstration Project—Sep., 1987.
CH2M Hill, Options Analysis–Machine Sources for Food Irradiation, Jan., 1988.
Drawing of the Florida Agricultural Commodities Irradiation Facility, Installation Upper Level Conveyor System Layout.
Drawing of the Floridal Agricultural Commodities Irradiation Facility, Installation Upper Level Conveyor System Layout.
Map of Florida Agricultural Commodities Irradiator, Lower Level.
Brochure—The Florida Linear Accelerator.
Irradiation of Anastrepha Suspense (Ditera: Tephritidae): New Irradiation Facility, Florida Entomologis, 1993, vol. 76, No. 2.
R.A. Harrod, AECL Gamma Sterilization Facilities, 1977, Radiation Physics and Chemistry, vol. 9, pp. 91–117.

* cited by examiner

ARTICLE IRRADIATION SYSTEM WITH MULTIPLE BEAM PATHS

CROSS REFERENCE TO RELATED APPLICATION(S)

This patent application is a Divisional application of U.S. patent application Ser. No. 09/987,966, filed Nov. 16, 2001 now U.S. Pat. No. 6,583,423, the subject matter of which is herein incorporated by reference in its entirety.

FIELD OF THE INVENTION

The invention relates to the field of systems for irradiating articles. In particular, the invention relates to article irradiation systems having conveyors.

DESCRIPTION OF THE RELATED ART

Radiation is used to treat many types of products or articles. The types of radiation used include, for example, X-rays, gamma rays, microwaves, and electron beams. The types of articles treated with radiation are many and varied. For example, radiation is used to treat silicon chips, polymers, medical devices, and more recently food. The Food and Drug Administration and the Center for Disease Control have both supported the irradiation of food products for controlling or eliminating microorganisms responsible for food poisoning such as *Escherichia coli* and *Salmonella sp.*

An irradiation system is disclosed in U.S. Pat. No. 5,396, 074 issued to Peck et al. on Mar. 7, 1995. Peck et al. describe a conveyor system that combines an overhead conveyor with a floor mounted conveyor. Article carriers are suspended from the overhead conveyor track. There is a stop or escapement on the overhead track which holds back the lead article carriers and accumulates carriers behind the escapement. A floor mounted load conveyor is located in a 90° turn and has "dogs" which grab the bottom of the carriers as they are released by the overhead escapement and convey them toward a process conveyer. The load conveyor accelerates then decelerates the article carriers so that they are mutually spaced upon the process conveyor.

According to Peck et al. the article carriers must be spaced apart to prevent contact between adjacent carriers while they traverse the single electron particle beam. It has been thought that contact with adjacent article carriers would substantially detract from the required uniform radiation dosing of an article. Further this spacing concept carried over to design of beam path conveyors, which provided a gap in the conveying chain to avoid radiation of the chain. Peck et al.'s beam pass conveyor or process conveyor is overly complicated. They describe a conveyor system with spacing between articles conveyed in front of the beam path. The process conveyor of Peck et al. has two conveyor claims with a gap in between so that the electron particle beam does not impact a conveyor chain. It would be advantageous to eliminate the gap between articles so that the emitted radiation is fully utilized, and to simplify the beam pass conveyor so that it is a continuous process conveyor.

It would be advantageous to have a simplified irradiation system with a conveyor system that is entirely floor mounted, and having multiple radiation beam paths. Such a system would simplify the tote transfer between conveyors.

Articles that are irradiated by a horizontally oriented beam may need to be rotated and radiated on another side depending on the depth of penetration of a particular type of radiation. For example, radiation from an electron beam may penetrate solid objects only a couple of inches, whereas X-rays may penetrate the same material to a depth of 8 inches or more. Peck et al. describe a conveyor system with a passive rotation system. The article carriers are rotated by a gear rack on the overhead conveyor. The article carriers hang from the overhead track by virtue of a rotatable collar with pins. The rack meets the pins and spins the article carrier as it passes by. The article carrier is then transported past the radiation beam again to irradiate the other side of the carrier. The passive rotation system of Peck et al. uses an extended tab on the collar to indicate whether the carrier has been rotated. There is no active control of the passive rotation device. It would be advantageous to have an irradiation system with a conveyor system that actively rotates articles and avoids the uncertainty of a passive rotation system with an indicator tab.

It is known that a single cyclotron can provide several paths and types of radiation. Peck et al. illustrates a system with only one electron beam path and one conveyor system. It would be advantageous to have an irradiation system with multiple beam paths, multiple types of radiation, and multiple conveyor systems that could be configured to treat different types of articles with different types of radiation.

Proper irradiation of articles requires precise and accurate dosing of articles. One way to ensure accuracy is to measure the speed of the conveyed articles. Peck et al. describe an irradiation system that measures the speed at which articles are being transported past the radiation source and responds by interrupting the radiation source if the speed of the articles is outside a given range. It would be advantageous to have a conveyor system that adjusts radiation intensity in response to speed fluctuations, which are inevitable in conveyor motors to ensure consistent treatment of articles.

Irradiation with X-ray (and to a lesser extent also by electron beams) is subject to side effects. Photons impinging in the center of the product will be scattered elsewhere inside the product, while x-rays impinging near the sides will partly be scattered to the outside of the product, and will be lost. The consequence of this is that the dose may fall off near the sides. Additionally, these side effects affect articles near the top and bottom faces of the totes, where the dose also may fall off.

These side effects create a problem in systems where there is a gap between article carriers on the process conveyor. Articles positioned near the front and back side of the articles carriers may receive a lower dose of radiation as a result these side effects. Additionally, articles positioned near the top and bottom faces of the article carrier may also receive a lower dose of radiation than other articles in the carrier. It would be advantageous to have a irradiation system that minimized these side effects.

BRIEF SUMMARY OF THE INVENTION

Irradiation systems involving conveyors are described herein. In one aspect, the irradiation system includes a radiation source, a first conveyor system and a second conveyor system. The radiation source has at least one beam path that extends substantially horizontally from the radiation source and at least on beam path that extends substantially downward from the radiation source. The first conveyor system transports articles from a loading area, through the horizontal beam path to an unloading area. The first conveyor system has a process loop for transporting articles through the horizontal beam path one or more times. The process loop has a rotator for rotating the articles around a vertical axes. The second conveyor system transports articles from a loading area, under the downward beam path, to an unloading area. The second conveyor system has a process loop to transport articles under the downward beam path one or more times.

The radiation system may be configured so that the horizontal beam is an X-ray beam and the downward beam is an e-beam. The process loop of any of the conveyor systems may include a roller flight conveyor adjacent to a beam pass conveyor. The roller flight conveyor precedes the beam pass conveyor and travels at a faster rate of speed than the beam pass conveyor and the beam pass conveyor transports articles through a horizontal beam path or under a downward beam path. The articles may be positioned on the beam pass conveyor so that there is little or no gap between articles. The beam pass conveyor may have a continuous chain in the beam path that is a flat top chain or an extended pin chain. The irradiation system may include totes or trays for transporting articles on the conveyors. The conveyor systems may be floor mounted. The irradiation system may include an upper level and a lower level with the first conveyor system located on the upper level and the second conveyor system located on the lower level. If the system includes an upper level and a lower level, a lowerator can be included for lowering trays from the upper level to the lower level and an elevator may be included for raising trays from the lower level to the upper level.

In another embodiment the irradiation system includes a radiation source, a conveyor system, and a control device. The radiation source has at least one beam path. The conveyor system transports articles through the beam path. The conveyor system has a roller flight conveyor adjacent to a beam pass conveyor. The roller flight conveyor precedes the beam pass conveyor and travels at a faster rate of speed than the beam pass conveyor. Articles traveling on the faster roller flight conveyor can be slowed when meeting up with articles traveling on the slower beam pass conveyor. The beam pass conveyor transports articles through the beam path on a continuous chain. The control device adjusts beam strength in response to changes in speed of the beam pass conveyor so that consistent dose delivery is achieved.

The beam pass conveyor may be a flat top chain for bearing articles or the beam pass conveyor may be two parallel stainless steel extended pin chains for capturing and bearing articles. Trays or totes may be used to transport articles on the conveyors.

In another embodiment the irradiation system includes a radiation source, a plurality of totes, a conveyor system, a totes stacker, and a tote destacker. The radiation source has at least one beam path. The totes carry articles. The conveyor system transports totes through the beam path. The conveyor system has a process loop to transport totes through the beam path a plurality of times. The tote stacker is in the process loop and stacks totes prior to transporting through the beam path a plurality of times. The totes destacker is in the process loop and separates stacked totes after transporting through the beam path conveyor system.

In another embodiment the irradiation system includes a lower level, a middle level, an upper level, a radiation source, a fist conveyor system, a second conveyor system, and a third conveyor system. The radiation source, located on the middle level, has at least one beam path extending substantially horizontally from the radiation source, at least one beam path extending substantially downward from the radiation source, and at least on beam path extending substantially upward from the radiation source. The first conveyor system, located on the middle level, transports articles from a loading area, through the horizontal beam path, to an unloading area, has a process loop for transporting articles through the horizontal beam path one or more times and has a rotator in the process loop for rotating the articles. The second conveyor system, located on the lower level, transports articles from a loading area, under the vertical beam path, to an unloading area, has a process loop to transport articles under the vertical beam path one or more times. The third conveyor, located on the upper level, transports articles from a loading area, under the vertical beam path, to an unloading area, has a process loop to transport articles above the vertical beam path one or more times.

DETAILED DESCRIPTION OF THE INVENTION

An irradiation system with multiple beam paths and multiple conveyor systems is disclosed. The multiple beam paths comprise at least one x-ray beam and one electron beam. Independent conveyor systems are designed to carry articles in front of or under the beam path depending on the positioning of the beam.

Figure 1:
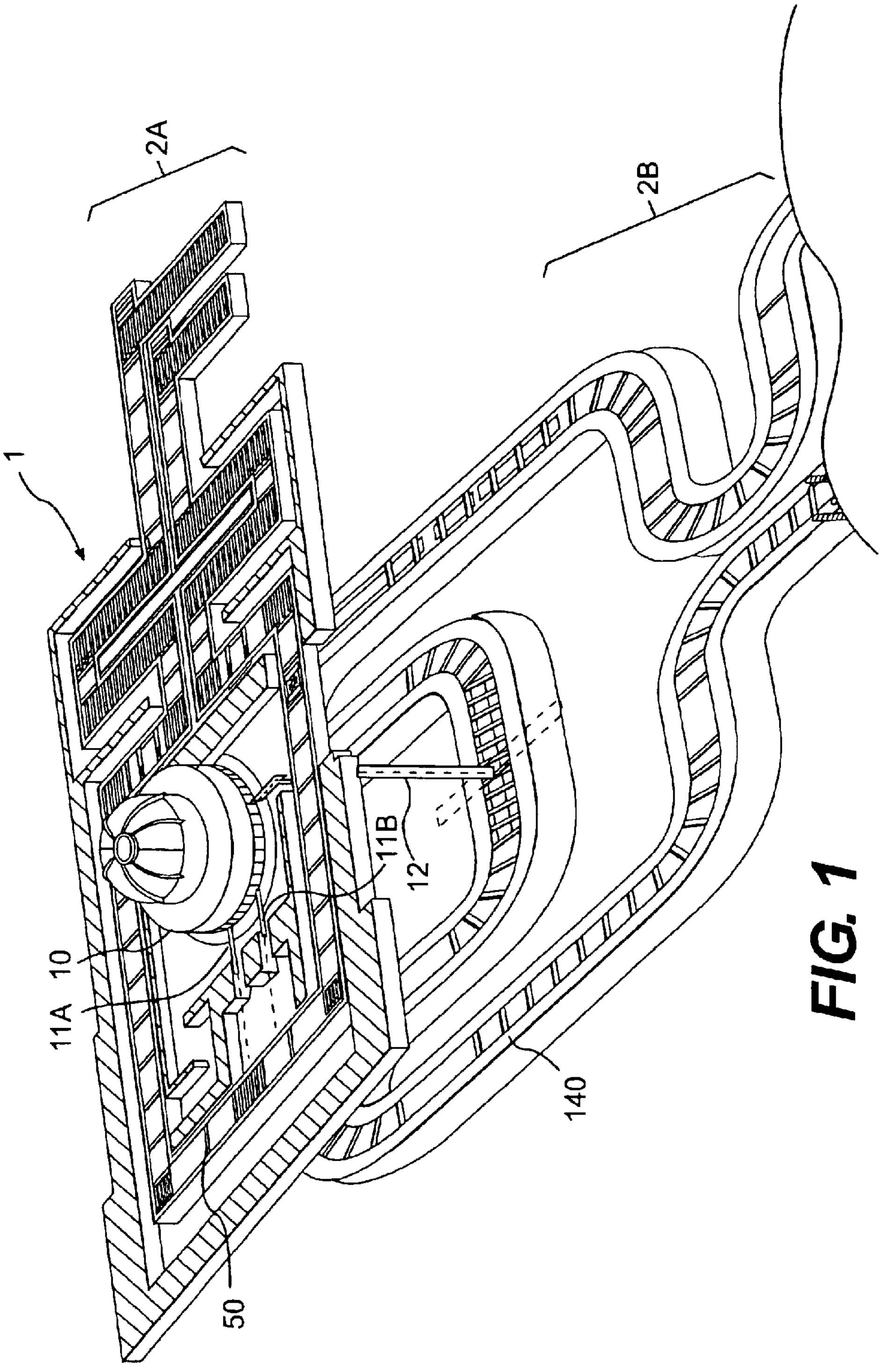
FIG. 1 is an elevated perspective schematic of a dual conveyor system made in accordance with the invention.

FIG. 1 illustrates the general layout of an article irradiation system 1 with multiple beam paths. The article irradiation system 1 consists of a radiation source 10, an upper level 2*a* with an upper level conveyor system 50, and a lower level 2*b* with a lower level conveyor system 140.

The radiation source 10 has three beam paths for irradiating articles on two separate levels, an upper level 2*a* and a lower level 2*b*. The preferred radiation source is a Rhodotron TT300 accelerator (available from I.B.A. sa.), however any radiation source known to those skilled in the art is acceptable. The radiation source 10 is positioned on the upper level 2*a*. Two beam paths are configured for x-rays. X-ray paths 11*a* and 11*b*, one at 5 Mev and the other at 7.5 Mev, extend horizontally from the radiation source 10 and irradiate articles on the upper level conveyor system 50. The third beam path 12 is a single electron particle beam or e-beam of 10 Mev 12. The electron beam 12 is directed vertically downward to treat articles on the lower level conveyor system 140. A magnet (not shown) is used to direct the electron beam downward.

Figure 2:
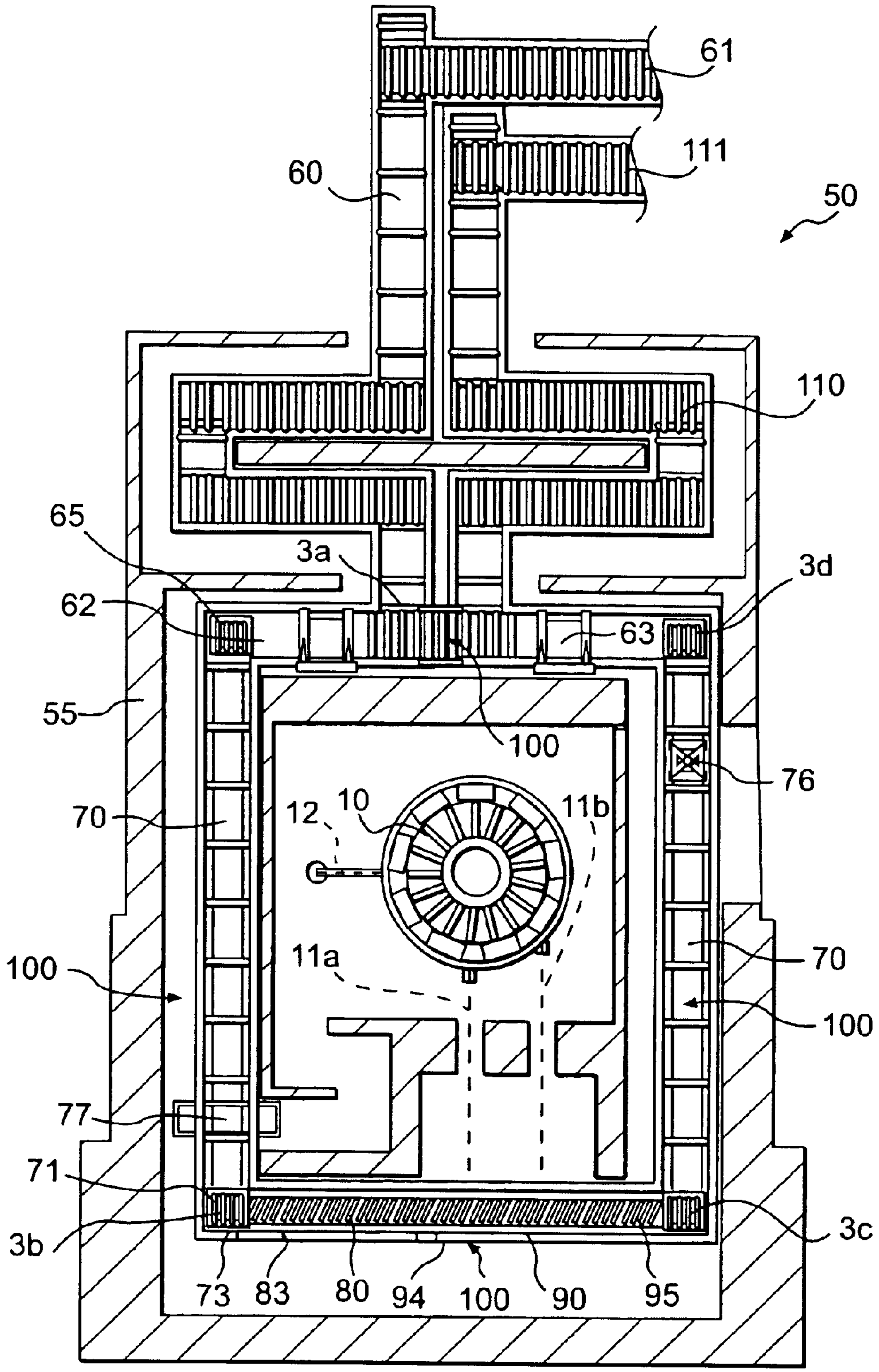
FIG. 2 is a top plan schematic view of the upper conveyor system of FIG.1.

FIG. 2 illustrates the upper level 2*a* of the article irradiation system 1. The upper level 2*a* is configured to treat articles with either of the x-ray beams 11*a* and 11*b*. Only one of the two x-ray beams 11*a* and 11*b* is operated at any one time. Articles to be irradiated are loaded into totes and conveyed in front of one of the x-ray beams 11*a* or 11*b* via the upper level conveyor system 50. The upper level conveyor system 50 is a floor mounted system and consists of an entry conveyor 60, a transport conveyor 70, an entrainment conveyor 80, a beam pass conveyor 90, and an exit conveyor 110. The transport conveyor 70, entrainment conveyor 80, and beam pass conveyor 90 connect to form a process loop 100 that is substantially square and surrounds the irradiator 10.

The totes are loaded onto the entry conveyor 60 from the load station 61. Totes may be loaded onto the entry conveyor 60 using a forklift or other acceptable device. The entry conveyor 60 extends from the load station 61 to the process loop 100. The entry conveyor 60 extends in a maze like configuration. This configuration is preferred over a straight line because additional shielding can be positioned at various points of the maze. An exit conveyor 110 extends away from the process loop 100 in a similar maze like configuration.

The process loop 100 is configured with four substantially linear sides connected by four 90° turns, labeled 3*a*, 3*b*, 3*c* and 3*d*. The transport conveyor 70 makes up more than three sides of the process loop 100 and operates to manipulate the physical configuration of the totes as they travel along the process loop 100. Totes enter and exit the process loop 100 via the entry conveyor 60 and the exit conveyor 100. The entry conveyor 60 is and the exit conveyor 100 connect to the process loop 100 at two different points of the transport conveyor 70 positioned between a tote stacker 62 and a tote destacker 63. Totes enter the transport conveyor 70 at a terminus 65 of the entry conveyor 60 and are stacked by the tote stacker 62.

Figure 3:
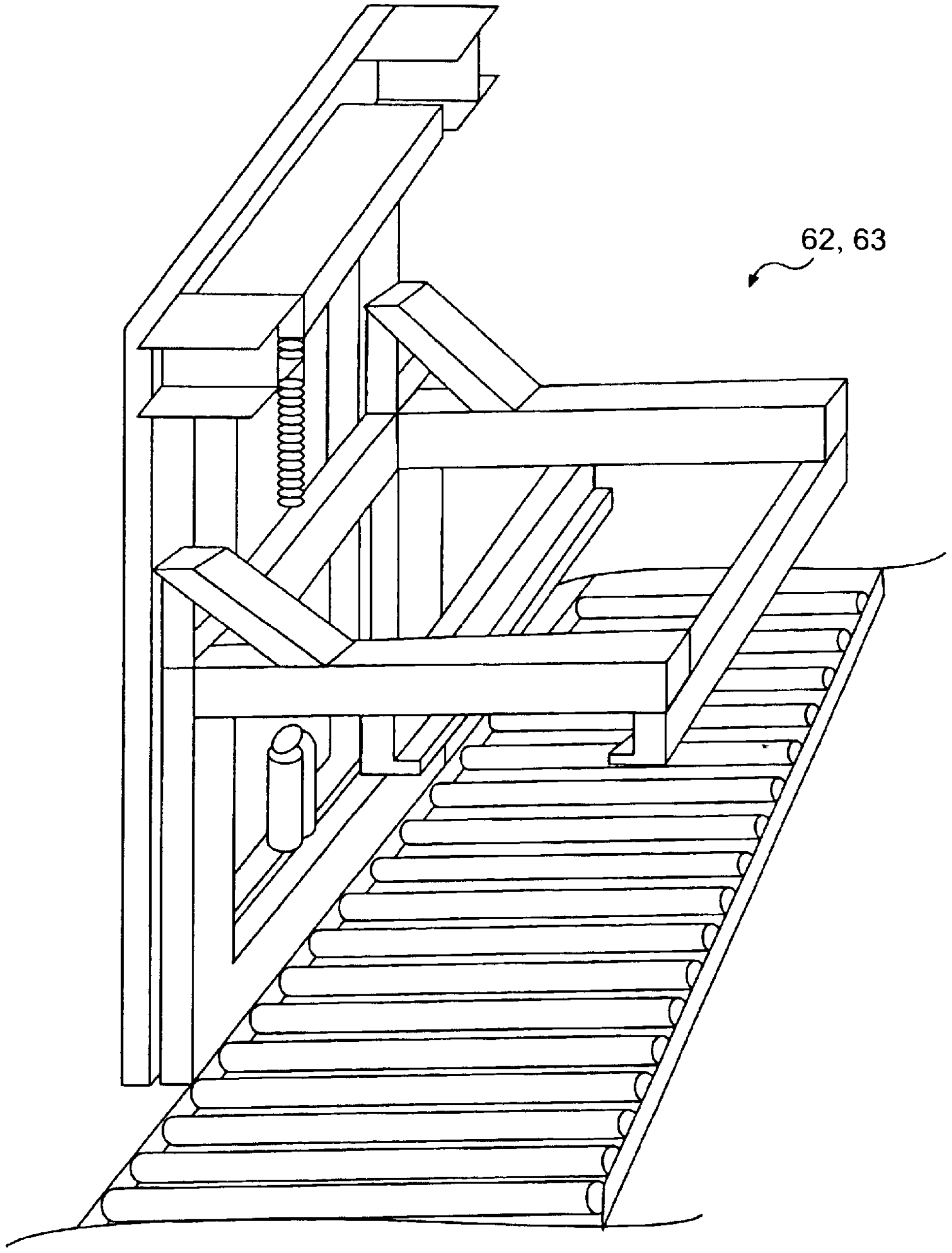
FIG. 3 is an elevated perspective showing the tote stacker and destacker used in the upper conveyor system.

The tote stacker 62, illustrated in FIG. 3, operates to stack totes that arrive from the entry conveyor 60. Two totes are stacked, one on top of the other, to form a tote stack that is ready to be treated by an X-ray beam 11*a* or 11*b*. The tote stacker 62 lifts the first tote up to an elevation where a second tote can transport underneath. Once the second tote arrives, the tote stacker 62 lowers the first tote until the top of the second tote makes contact with the bottom of the first tote forming a tote stack. The bottom tote bears the top tote. Throughout this application, when describing activities within the process loop 100, the terms tote and tote stack are used interchangeably and the use of one is not meant as a limitation unless otherwise noted.

Totes are stacked on this conveyor system to address the problem of horning that is encountered with treating articles with X-rays. By stacking totes for a first pass through the X-ray beam and then inverse stacking the same totes through a second pass of the X-ray beam, each portion of both totes receives uniform treatment. For example, totes A and B are stacked with A on top and B on bottom. As the tote stack is passed through the X-ray beam, the bottom of tote A and the top of tote B receive higher doses of X-rays than the top of tote A and the bottom of tote B. To address this problem, the totes are restacked so that tote B is on the top and tote A is on the bottom and passed in front of the X-ray beam a second time. On the second pass the top of tote A and the bottom of tote B receive the higher dose while the bottom of tote A and the top of tote B receive a lower dose. As a result the combined exposure of the entire tote is substantially consistent. Additional dosing schemes are discussed below.

The front leg of the transport conveyer 70 runs from the tote stacker 62, around a 90° turn 3*a*, through a conveyor crossover point 77 and terminates at the inlet of the entrainment conveyor 80 to form a 90° turn 3*b*.

Figure 4:
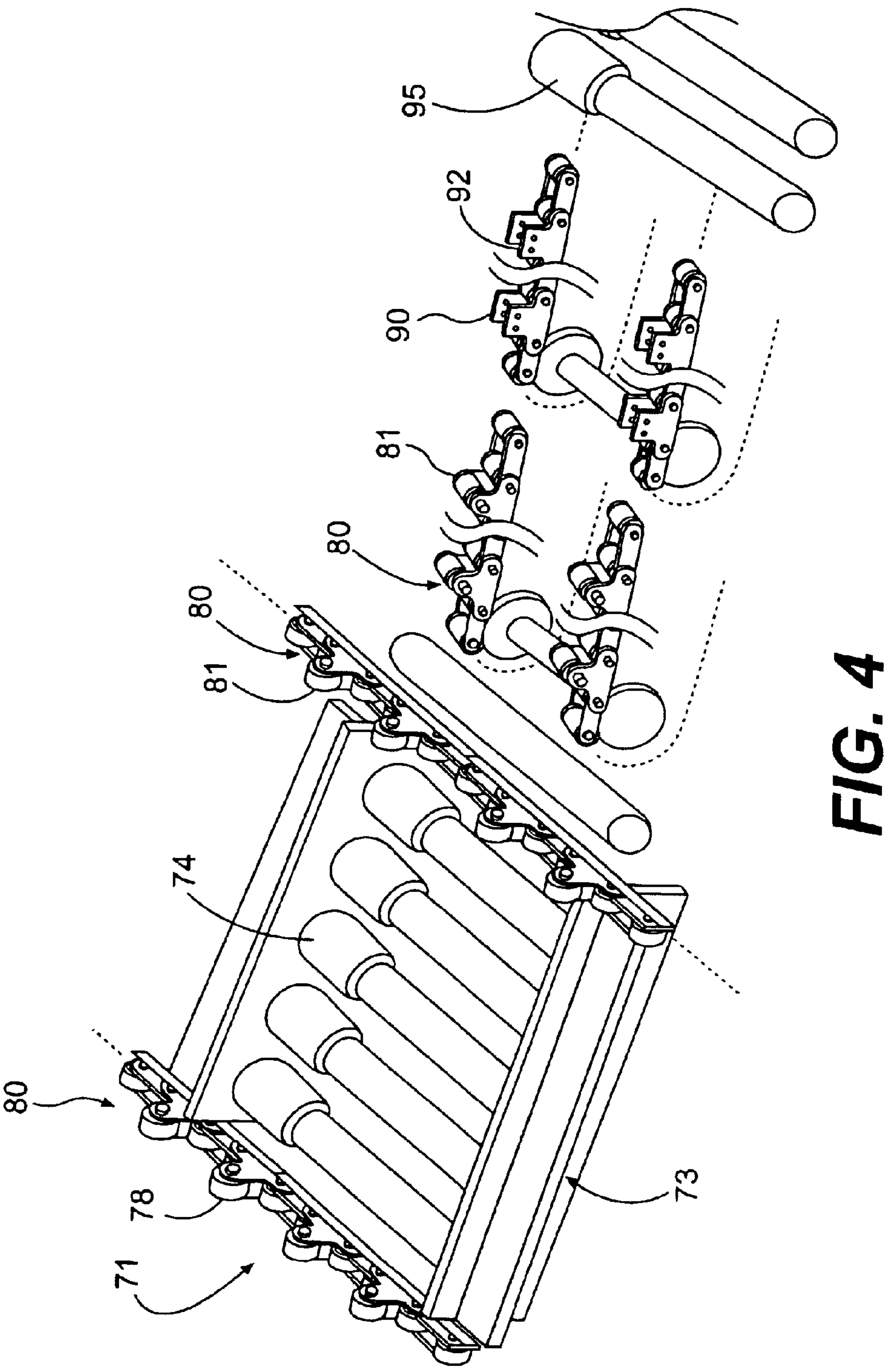
FIG. 4 is an elevated perspective of a portion of the upper conveyor system of FIG. 2.

FIG. 4. illustrates the approach to the beam pass conveyor from the 90° turn 3*b*. A rolling lifter 73 is positioned at the 90° turn 3*b*. The rolling lifter 73 raises the tote stacks on powered rollers 74 about 2" above the roller flight chain 81 of the transport conveyor 70. The powered rollers 74 propel the tote stacks forward to the entrainment conveyor 80, which is at the same elevation as the raised tote stacks on the lifting device 73.

Entrainment conveyor 80 controls the speed of the totes so that totes do not accumulate at any point on the system. A sensor 83 (not shown), senses when there is room on the entrainment conveyor 80 for another tote stack. When there is enough room on the entrainment conveyor 80 for another tote stack, the transport conveyor 70 conveys a tote stack to the lifting device 73, which propels the tote stack onto the entrainment conveyor 80.

Figure 5:
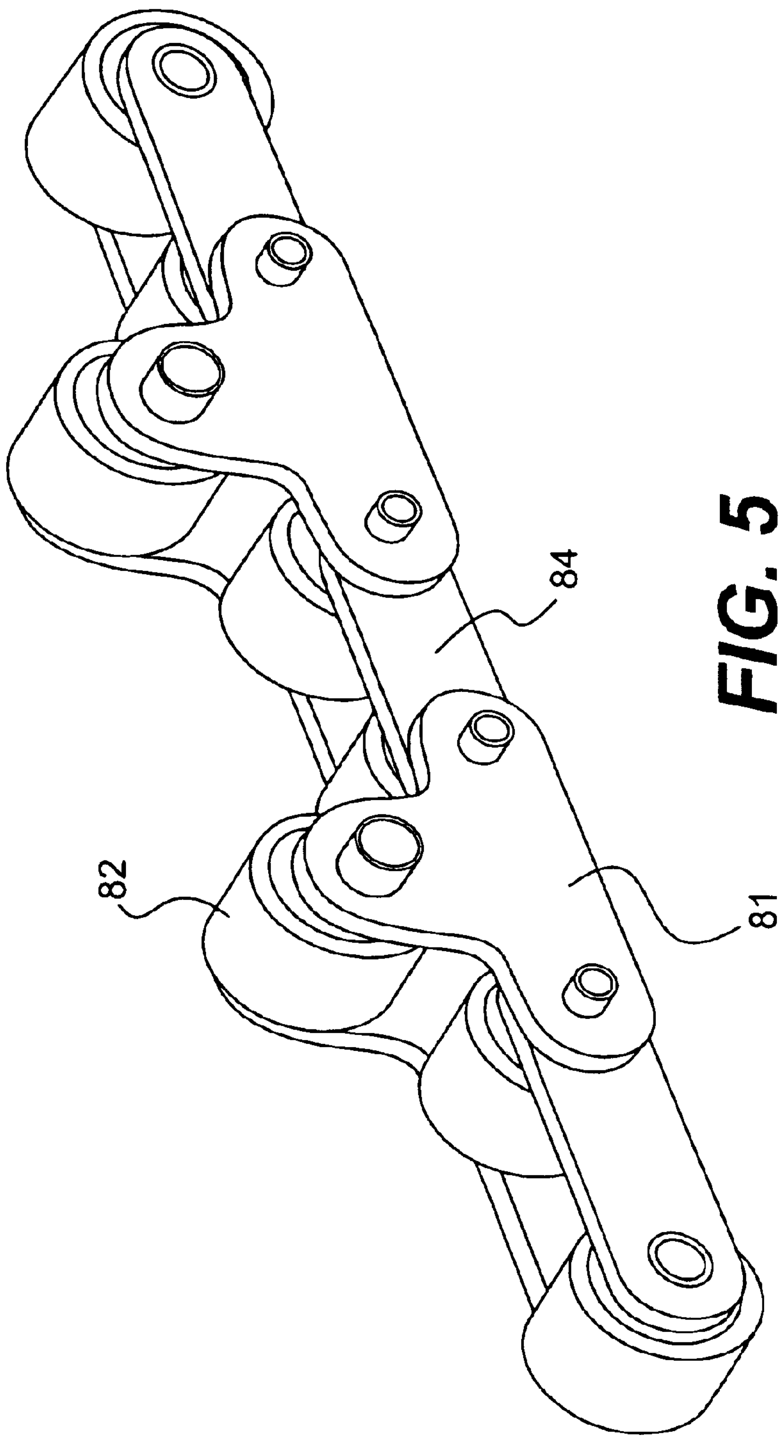
FIG. 5 is an elevated perspective of a high roller chain used in the upper-conveyor system.

Both the transport conveyor 70 and entrainment conveyor 80 utilize roller flight chains 81. FIG. 5 illustrate a roller flight chain 81. The roller flight chain 81 is a chain with elevated wheels, called high rollers 82, positioned between each link 84 of the chain.

Referring back to FIG. 4, the entrainment conveyor 80 extends from the lifting device 73 to the beam pass conveyor 90. The exact terminus of the entrainment conveyor 80 can vary, but is prior to the x-ray paths 11*a* and 11*b*.

The beam pass conveyor 90 is a one-piece conveyor that transports tote stacks past the x-ray paths 11*a* and 11*b* to a set of powered rollers 95 that extend to a 90° turn 3*c*. The beam pass conveyor 90 is speed locked to the radiation source 10. The speed of the beam pass conveyor 90 is preferably consistent. However, the drive motor (not shown) is subject to small variations in speed for a variety of reasons, including, for example variations in line power. It is therefore preferred to relate the speed of the drive motor to the strength of the radiation source in a master/slave relationship. If the drive motor slows down, the intensity of the radiation will increase and vice versa. The drive motor may also be configured to shut down both the beam pass conveyor and the radiation source, should the speed of the drive motor be outside predefined limits.

Figure 6:
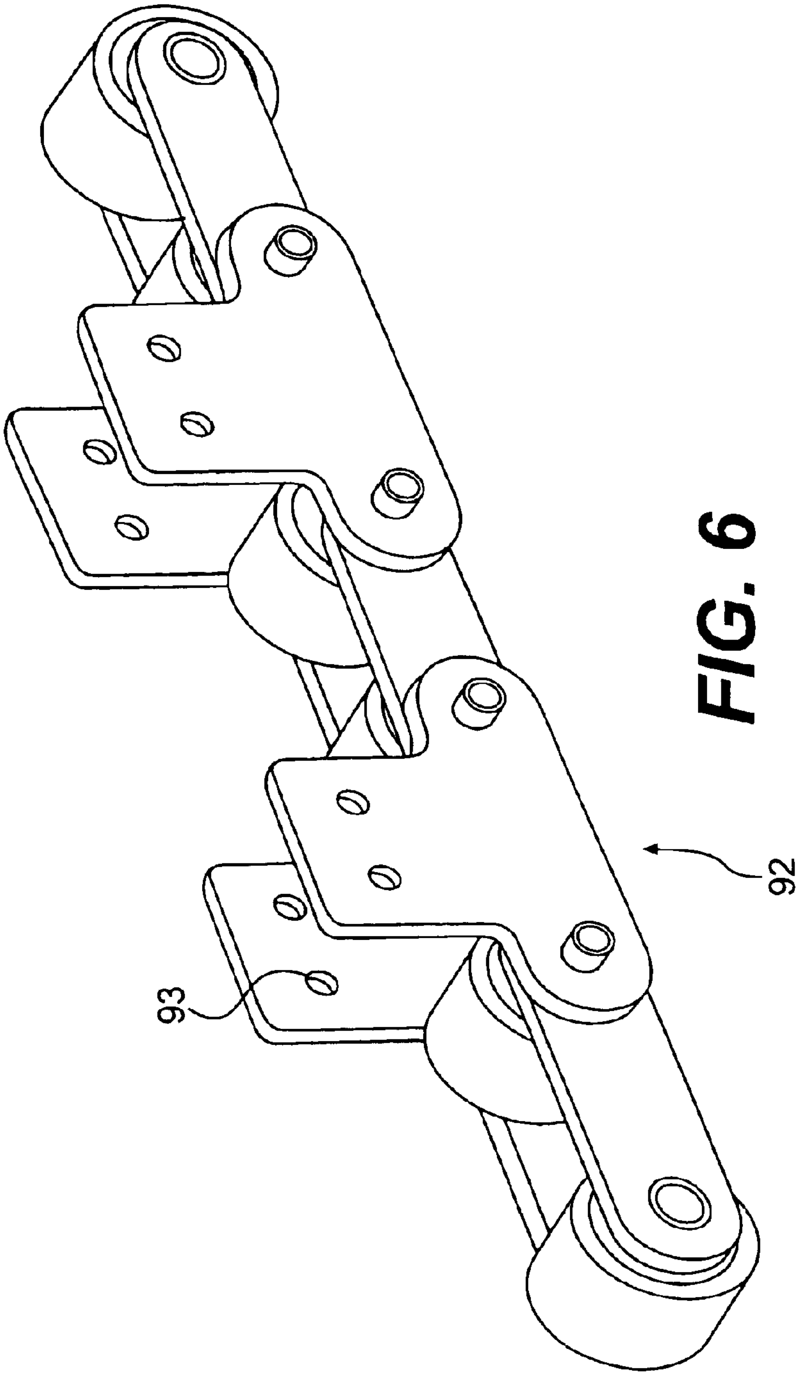
FIG. 6 is an elevated perspective of a flat top chain used in the upper conveyor system in the beam path.

The beam pass conveyor 90 utilizes a flat top chain 92 to bear tote stacks. FIG. 6. illustrates the flat top chain 92. The flat top chain 92 has dogs 93 that bear the tote stacks but do not capture them.

Tote stacks convey directly from the entrainment conveyor 80 to the beam pass conveyor 90. Tote stacks on the entrainment conveyor 80 are conveyed at the same speed as the roller flight chain 81 because under normal conditions the high rollers 82 do not rotate. The entrainment conveyor 80 moves at a faster rate of speed than the beam pass conveyor 90 causing tote stacks on the roller flight conveyor

80 to contact tote stacks on the beam pass conveyor 90. The contact between tote stacks causes the high rollers 82 on the roller flight chain 81 to rotate in a backwards direction. The rotation of the high rollers 82 allows the roller flight chain 81 to continue moving under the tote stacks on the roller flight conveyor 80. The backwards rotation of the high rollers 82 creates a rolling friction that maintains a constant forward pressure on the totes conveying onto the beam pass conveyor 90. The forward pressure entrains the totes entering the beam path and positions the totes so there are no gaps between the tote stacks on the beam pass conveyor 90. Having a "gap" means there is not contact between totes. This elimination of gaps is important to maximize utilization of the radiation and to eliminate side effects.

The conveyor configuration described in FIG. 4 is the preferred configuration for entraining totes and positioning totes so there are no gaps between totes stacks. Other methods, however, may be used to entrain the totes including, for example, wheels or rollers positioned on the underside of the article carriers. Alternatively, a conveyor or article carrier may be used that produces a low amount of friction between the article carrier and the conveyor so that article carriers are entrained.

Referring to FIG. 2, a gap fault switch 94 is positioned at a point adjacent to the beam pass conveyor 90. The gap fault switch 94 senses gaps or space between adjacent totes as a function of time. If the time between adjacent totes is greater than a predefined limit the gap fault switch signals the system to shut down.

The beam pass conveyor 90 extends to a point past the X-ray beam 11*a* and 11*b* where it connects with a set of powered rollers 95 that conveys totes from the beam pass conveyor 90 to another 90° turn 3*c* that intersects with the next leg of transport conveyor 70. The rollers following the beam pass conveyor 90 move totes at a higher speed than the beam pass conveyor 90.

Figure 7:
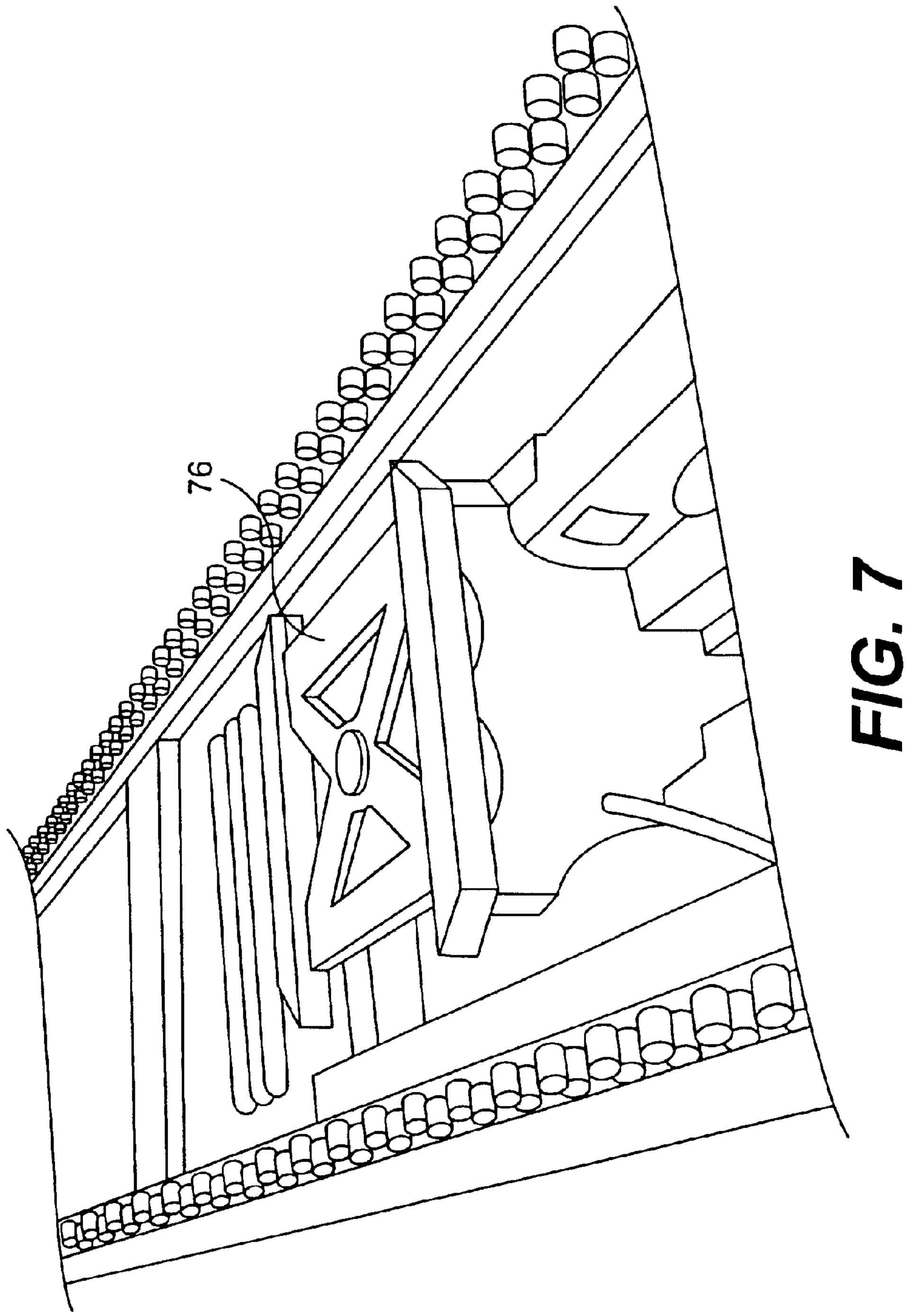
FIG. 7 is an elevated perspective of a turntable used in the upper conveyor system for rotating totes.

The next leg of the transport conveyor 70 extends from another 90° turn 3*c* to a turntable 76. The turntable 76 is illustrated in FIG. 7. The turntable 76 operates to rotate totes. Preferably the turntable 76 rotates totes 180° so that both sides of the totes can be irradiated. However it is possible to rotate totes at any angle such as, for example, 90° or 60°, and pass the totes several times through the beam path.

The transport conveyor 70 makes another 90° turn 3*d* and extends to the tote destacker 63 shown in FIG. 3. The tote destacker 63 operates in a similar manner to the tote stacker 62 except that it separates a tote stack into individual totes. The tote destacker 63 lifts the upper tote of a tote stack allowing the lower tote of a tote stack to leave the destacker 63 first. This ensures that the lower tote of a tote stack becomes the upper tote and the upper tote becomes the lower tote for a subsequent pass through the tote stacker 62.

The transport conveyor 70 continues to an intersection with the exit conveyor 110. The exit conveyor 110 branches off of the transport conveyor 70 and leads to an unload area 111. Totes that have been separated by the tote destacker 63 are either directed out of the process loop 100 via the exit conveyor 110 or continue forward and remain on the process loop 100 for another pass in front of the X-ray beam. The transport conveyor 70 continues past the entry conveyor 60 terminus 65 and back to the tote stacker 62 to complete the process loop. Totes that remain on the process loop 100 may be re-stacked by the tote stacker 62.

Articles carried in the totes will sometimes require multiple passes in front of one of the X-Ray beams 11*a* or 11*b* in order to optimize the dose delivery to the product. Each tote may require processing on both sides and on each level (the upper and lower level of a tote stack). The result of this scenario is that each tote will pass in front of the X-ray up to four (4) times to receive its optimum dose delivery. This scenario may be by-passed for certain products as determined by the process requirements. There are a number of configurations for multiple pass, stacking and unstacking. Several examples are given below. The operator at the control system may select, for example one, two or four passes. In addition the operator may select to rotate or not to rotate the tote during processing.

EXAMPLE 1

One Pass

The processing of the totes in one pass mode is achieved by rotating the totes 180° on the turntable 76 after completion of the first pass. The tote is then conveyed to the unload area via the exit conveyor 110. This gives a total rotation of 180° from pass one to the exit conveyor 110 insuring proper tote door orientation for unloading.

EXAMPLE 2

Two-Pass (with Rotation)

The processing of the totes in this two-pass mode is achieved by rotating the totes 180° on the turntable 76 after completion of the first pass. This gives a total rotation of 180° from pass one to pass two. After completion of pass two the tote is conveyed out to the unload area via the exit conveyor 110.

EXAMPLE 3

Two-Pass (no Rotation)

The processing of the totes in this two-pass mode is completed with no rotation of the totes on the turntable 76 after the first pass. This gives a total rotation of 0° from pass one to pass two. After completion of pass two, the tote is rotated 180° as it exits to insure proper tote door orientation for unloading.

EXAMPLE 4

Two Pass (Interchange)

The interchange selection will cause the totes to be vertically interchanged between pass one and two.

EXAMPLE 5

Four Pass (with Rotation)

The processing of the totes in four-pass mode with rotation selected is achieved by rotating the tote as follows: A 180° rotation on tote exit from the first pass. This gives a total rotation of 180° from pass one to pass two. A 180° rotation on tote exit from the second pass. This gives a total rotation of 180° from pass two to pass three. A 180° rotation on tote exit from the third pass, for a total rotation of 180° from pass three to pass four. After completion of pass four the tote is conveyed out of the process loop 100 to the unload area via the exit conveyor 110.

EXAMPLE 6

Four Pass (without Rotation)

The processing of the totes in four pass mode without rotation selected is achieved by rotating the tote as follows:

A 0° rotation on tote exit from the first pass. This gives a total rotation of 0° from pass one to pass two. A 0° rotation on tote exit from the second pass. This gives a total rotation of 0° from pass two to pass three. A 0° rotation on tote exit from the third pass, for a total rotation of 0° from pass three to pass four. After completion of pass four, the tote is rotated 180° as it exits to insure proper tote door orientation for unloading.

EXAMPLE 7

Four Pass (Interchange)

The interchange and rotation selection are independent of each other. Interchange selection will cause the totes to be vertically interchanged between passes two and three. Totes will be rotated between pass one and two and between pass three and four.

Other configurations are possible, including configurations that turn totes 60° or 90° for example. If a tote has only one door at a particular end, a processed tote may require 180° rotation to put the door of the tote on the correct side for unloading. Reorientation of the tote will be performed by the turntable 76 as required, regardless of operator rotational selection.

In a preferred mode of operation, the process specification starts at the load station 61. The system is set up to load totes in batches, e.g., 14 totes. The process loop 100 of the system can process batches of either 14 or 28 totes. Other designs discernable by those skilled in the art may accommodate any number of totes in a batch. It is preferred that the number be programmed in so that the system might count the totes in a batch to control multiple passes.

Totes can be loaded via a removable end door. Pre-loaded totes of articles to be treated can be loaded onto the entry conveyor 60 at the load station 61 using a forklift or empty totes can be loaded right on the entry conveyor 60 at the load station 61. Totes at the load station are automatically positioned at and manually released from the load station 61 area in groups of 14 using a load release button. Once released, the totes then move through the entry conveyor 60 and into the process loop 100.

The batch is processed using the preset parameters of rotation, vertical interchange, beam current, process speed etc. that are set prior to batch loading. Once the required processing is complete the system goes into batch process complete mode in which the X-Ray is turned off and the treated product is conveyed to the unload station. The full batch of 14 or 28 totes is conveyed out of the process loop 100. The batch is unloaded in 14 tote groups. After a group of 14 totes is unloaded the unload release button is pushed and the group of 14 totes is conveyed around a 180 degree curve to the load side of a warehouse area.

If totes in the process loop 100 are being processed, loaded untreated totes are held on the entry conveyor 60 until the totes in the process loop 100 have completed processing. Tote stacks are counted as they pass a "TRAY ENTERING BEAM" limit switch. At the end of processing, the system will go into "BATCH PROCESS COMPLETE" mode. This occurs after the last tote stack is processed. The X-Ray turns off using a "BEAM ON/OFF" signal to the RHODOTRON 10 and the treated totes are to be conveyed to the unload area via the exit conveyor 110. To prevent the first stack in the batch from being overdosed as the last stack passes the beam, the stacks are to be separated on the last pass, using a stack counter. This is done by disabling the cross transfer before the beam pass. After the beam is turned off the cross transfer is enabled to allow the exit of the treated stacks. After all the treated totes have left the process loop 100, the untreated totes enter the process loop and are stacked by the tote stacker 62. The speed of the beam pass conveyor 90 will be set as required by the "BEAM PASS CONVEYOR SPEED" for the batch. When the first stack enters the beam pass area the beam will turn on using the "TRAY ENTERING BEAM" limit switch and "BEAM ON/OFF" signal to the beam source 10. At this time "BATCH PROCESS COMPLETE" is turned off and batch processing starts.

Figure 8:
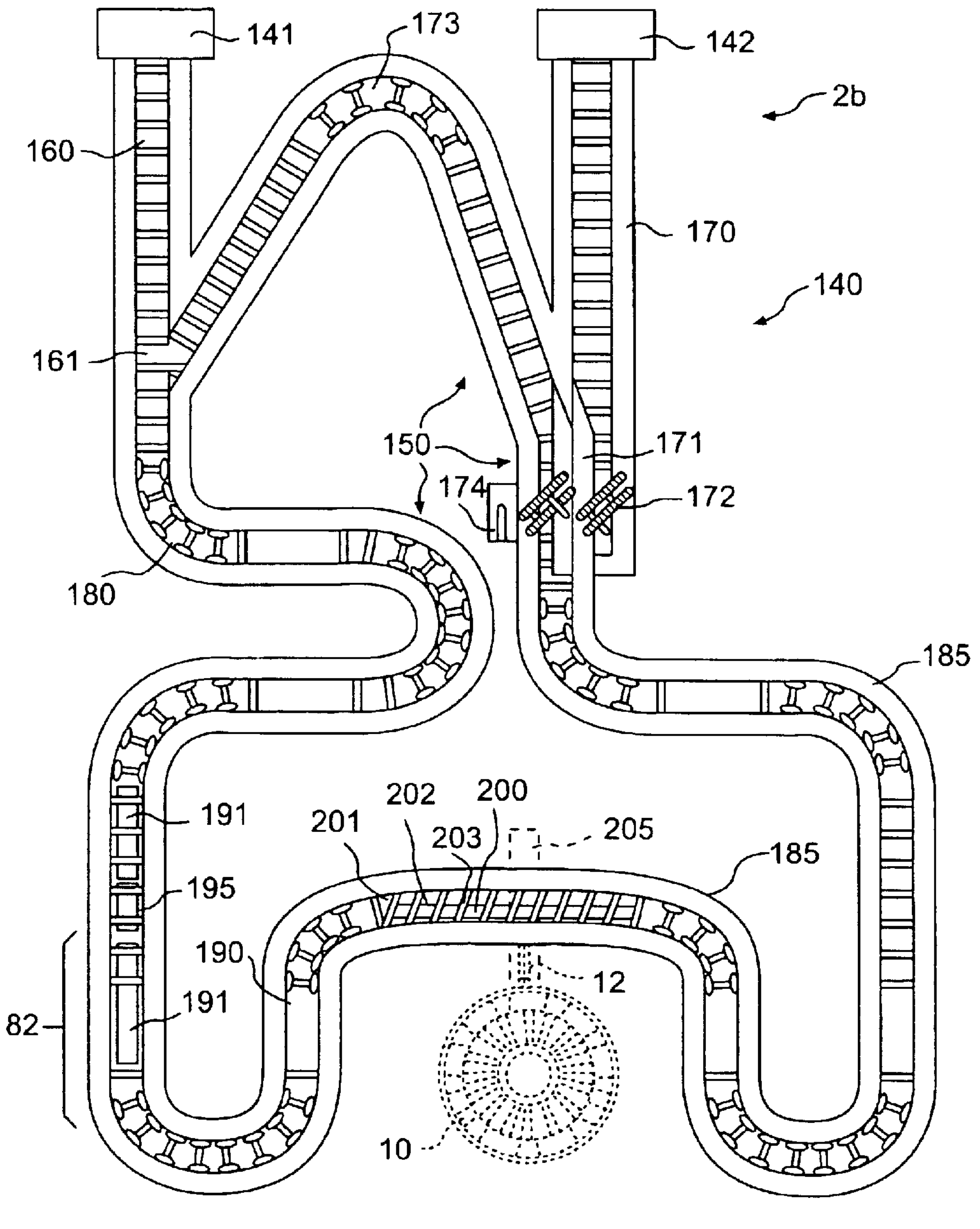
FIG. 8 is a overhead view of the lower conveyor system of FIG. 1.

FIG. 8 illustrates the lower level **2*b* of the article irradiation system 1. The lower level 2*b* is configured to treat articles with a 5, 7, or 10 MeV electron beam 12. Articles are loaded onto trays and conveyed under the downwardly projected electron beam 12 on the lower level conveyor system 140. System 140 is equipped with a "lowerater" 141 and an elevator 142. The lowerator 141 lowers loaded trays from a loading station located on the upper level 2*a* to the lower level conveyor system 140. The elevator 142 raises treated trays to an unload station located on the upper level 2*a***.

The lowerator 141 and elevator 142 "build" shelves underneath each tray as they enter. When a tray is in the lowerator 141 or elevator 142 the shelf transitions from horizontal "building" to vertical movement. When complete, the tray transitions from vertical movement to horizontal movement and sends the tray to the other level (lower or upper) as required. Lowerators and elevators are known in the industry as "Z" lifters.

The lower level conveyor system 140 is a floor mounted conveyor system that contains a process loop 150, an entry conveyor 160 and an exit conveyor 170. The entry conveyor 160 connects the lowerator 141 with the process loop 150 at an intersection 161. The exit conveyor 170 connects the elevator 142 with the process loop 150 at a reroute junction 171. The reroute junction 171 is configured to direct trays to either the exit conveyer 170 or back to the process loop 150 for another round of treatment.

The process loop 150 consists of a transport conveyor 180, an entrainment conveyor 190, and a beam pass conveyor 200. The transport conveyor 180 connects at the inlet of the entrainment conveyor 190 and the outlet of the beam pass conveyor 200. The transport conveyor also intersects with the entry conveyor 160 and exit conveyor 170. The outlet of the entrainment conveyor 190 connects with the inlet of the beam pass conveyor 200 thereby completing the process loop 150.

Figure 9:
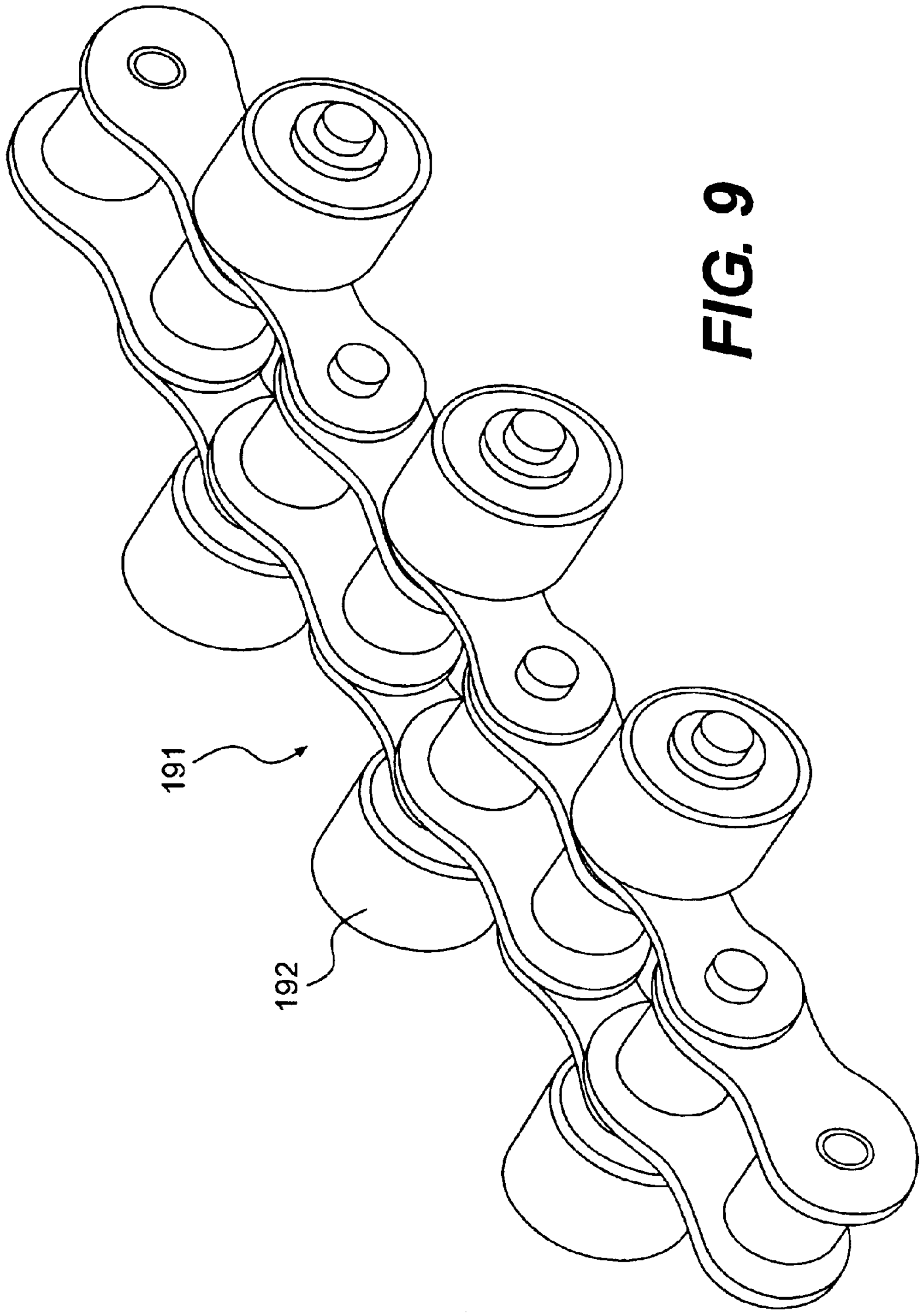
FIG. 9 is an elevated perspective of a small roller flight chain used in the lower conveyor system.

Trays enter the process loop 150 on the transport conveyor 180 and are conveyed to the entrainment conveyor 190. The entrainment conveyor 190 for the lower level conveyor system 140 operates the same as the entrainment conveyor 80 for the upper conveyor system 50. The entrainment conveyor 190 utilizes a small roller flight chain 191, illustrated in FIG. 9. The small roller flight chain has high rollers 192. Trays rest on the high rollers 192 of the small roller flight chain 191 prior to entering the beam pass conveyor 200. The entrainment conveyor 190 travels at a higher rate of speed than the beam pass conveyor 200. As trays convey on the beam pass conveyor 200, trays on the entrainment conveyor 190 make contact with the trays in front of them. The high rollers 192 on the entrainment conveyor 190 rotate backward keeping a constant forward pressure on the trays entrainment conveyor 190 causing trays to entrain as they enter the beam pass conveyor 200. As a result there is a closure of gaps between trays moving along the beam pass conveyor 200. A "gap" means there is no contact between trays.

Figure 10:
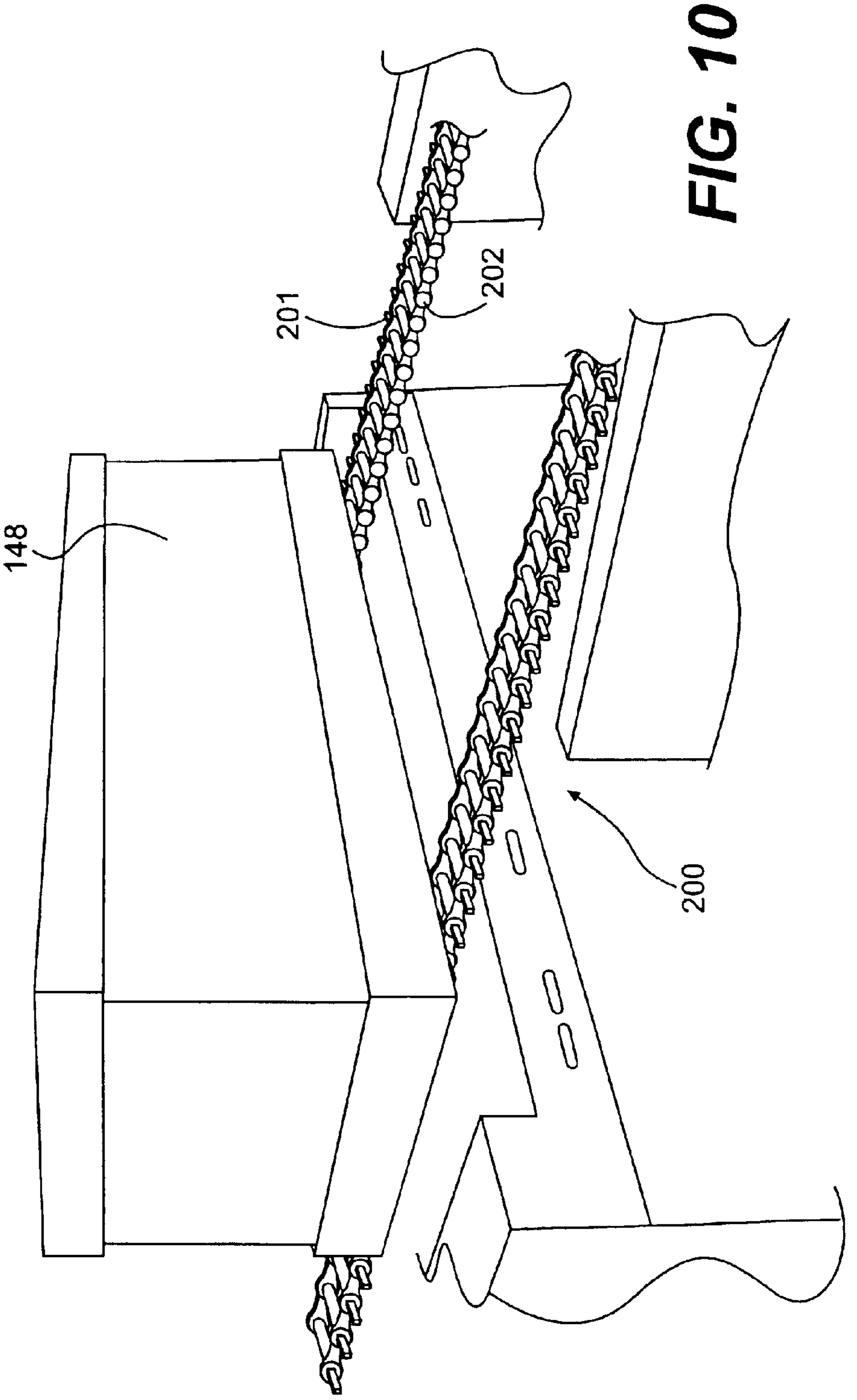
FIG. 10 is an elevated perspective of the tray used to transport articles on the lower level conveyor system.
Figure 11:
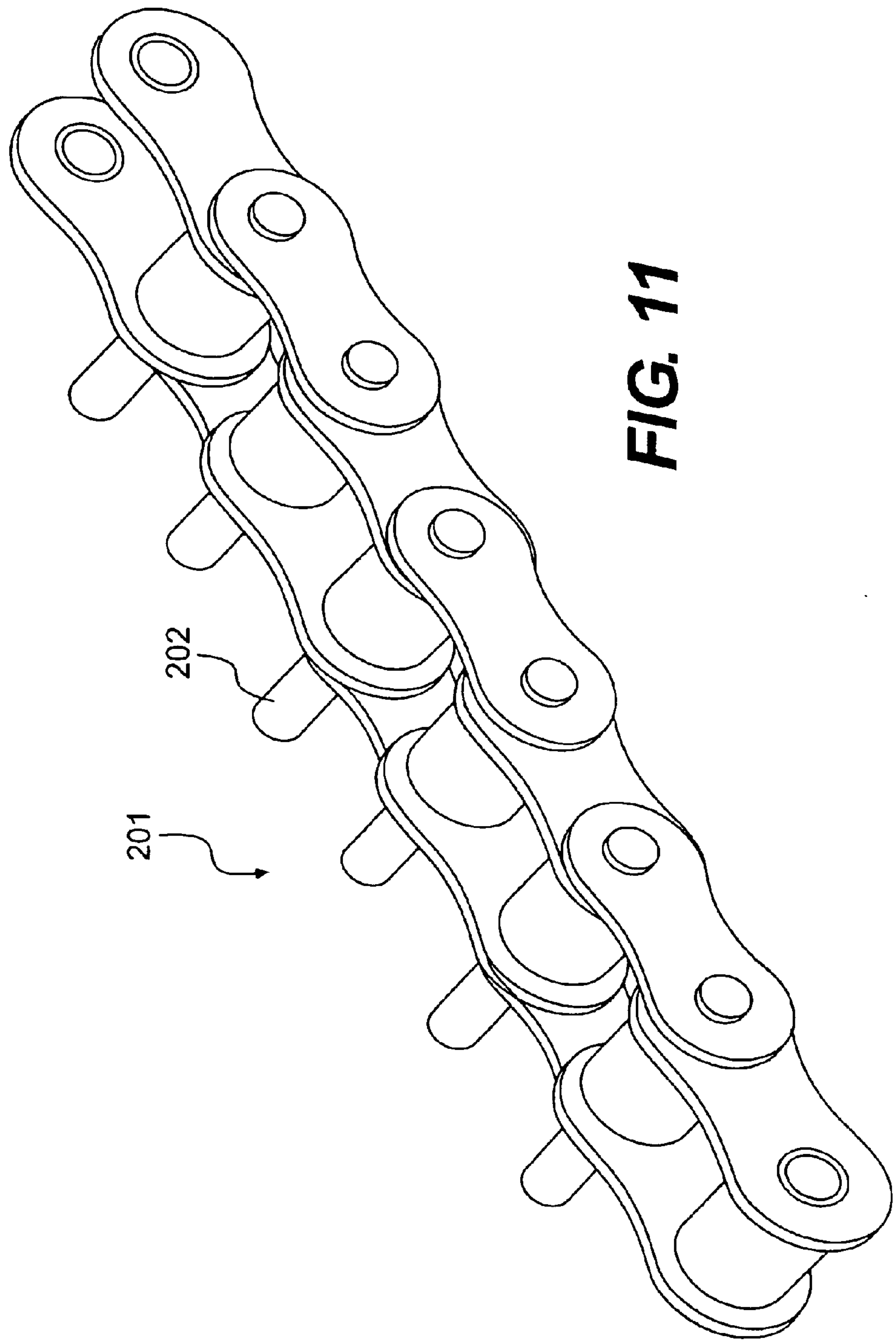
FIG. 11 is an elevated perspective of an extended pin chain used in the lower conveyor system in the beam path.
Figure 12:
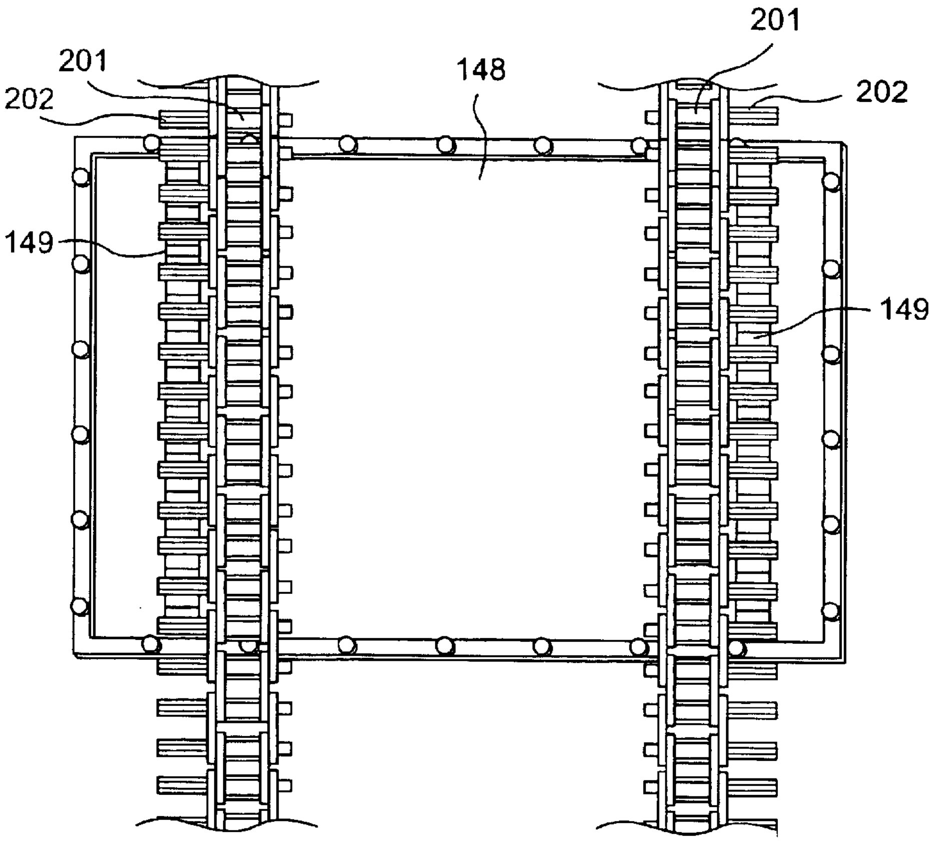
FIG. 12 is an underneath perspective of the tray used to transport articles on the upper level conveyor system resting on a rack and extended pin chain.

The beam pass conveyor 200 is a one-piece conveyor that conveys trays under the electron beam. The beam pass conveyor 200 utilizes two parallel stainless steel chains 202, which extend from the roller flight conveyor 190, under the electron beam 12 and over the beam stop 205, to the transport conveyor 180. FIG. 10 illustrates a tray 148 being conveyed by the beam pass conveyor 200. The trays rest on racks 149 (not shown) with evenly spaced downward semi-circular grooves. The chains 201, illustrated in FIG. 11, have pins 202 extending from the side to capture the racks 149 exiting the entrainment conveyor 190, thereby capturing and securing the trays. FIG. 12 illustrates the bottom of a tray 148 resting on a rack 149 captured by the pins 202 of the chain 201. The chains 201 are preferably made of stainless steel in order to withstand the environment of the electron beam 12. Under normal operating conditions, the chain 201 exposure to the electron beam 12 will be minor due to the absence of space between trays.

The speed of the beam pass conveyor 200 is preferably consistent. However, the drive motor is subject to small variations in speed for a variety of reasons, including, for example variations in line power. Again, it is therefore preferred to relate the speed of the drive motor to the strength of the radiation source in a master/slave relationship. If the drive motor slows down, the intensity of the radiation will increase and vice versa. The drive motor may also be configured to shut down both the beam pass conveyor and the radiation source, should the speed of the drive motor be outside predefined limits.

A gap fault switch 203 is positioned at a point near the entrance to the beam pass conveyor 200. The gap fault switch senses gaps or space between adjacent trays as a function of time. If the time between adjacent trays is greater than a predefined limit the gap fault switch signals the radiation source to shut off the beam for a length of time that corresponds to the time between the adjacent trays. While the beam is shut off, the conveyor continues to run. As the next tray approaches the beam path, the beam is turned back on. This function conserves power by not using the beam to irradiate empty space and minimizes the exposure of the chains 201 to the beam should there be any gaps between adjacent articles.

Prior to reaching the entrainment conveyor 190, trays convey through a spacer section 182 in the process loop 150. The spacer section operates to regulate the spacing of the trays before the trays reach the entrainment conveyor 190.

The spacer section has a section of small roller flight chain 191, followed, by a section of extended pin chain 195, and then another section of small roller flight chain 191. The extended pin chain 195 moves at a slower speed than the roller flight chains 191. This configuration operates to entrain trays on the extended pin chain 195 and the small roller flight chain 195 preceding the extended pin chain 195. The small roller flight chain 195 after the extended pin chain 195 conveys trays away from the entrained trays at evenly spaced intervals thereby ensuring a consistent supply of trays to the entrainment conveyor 190.

Figure 13:
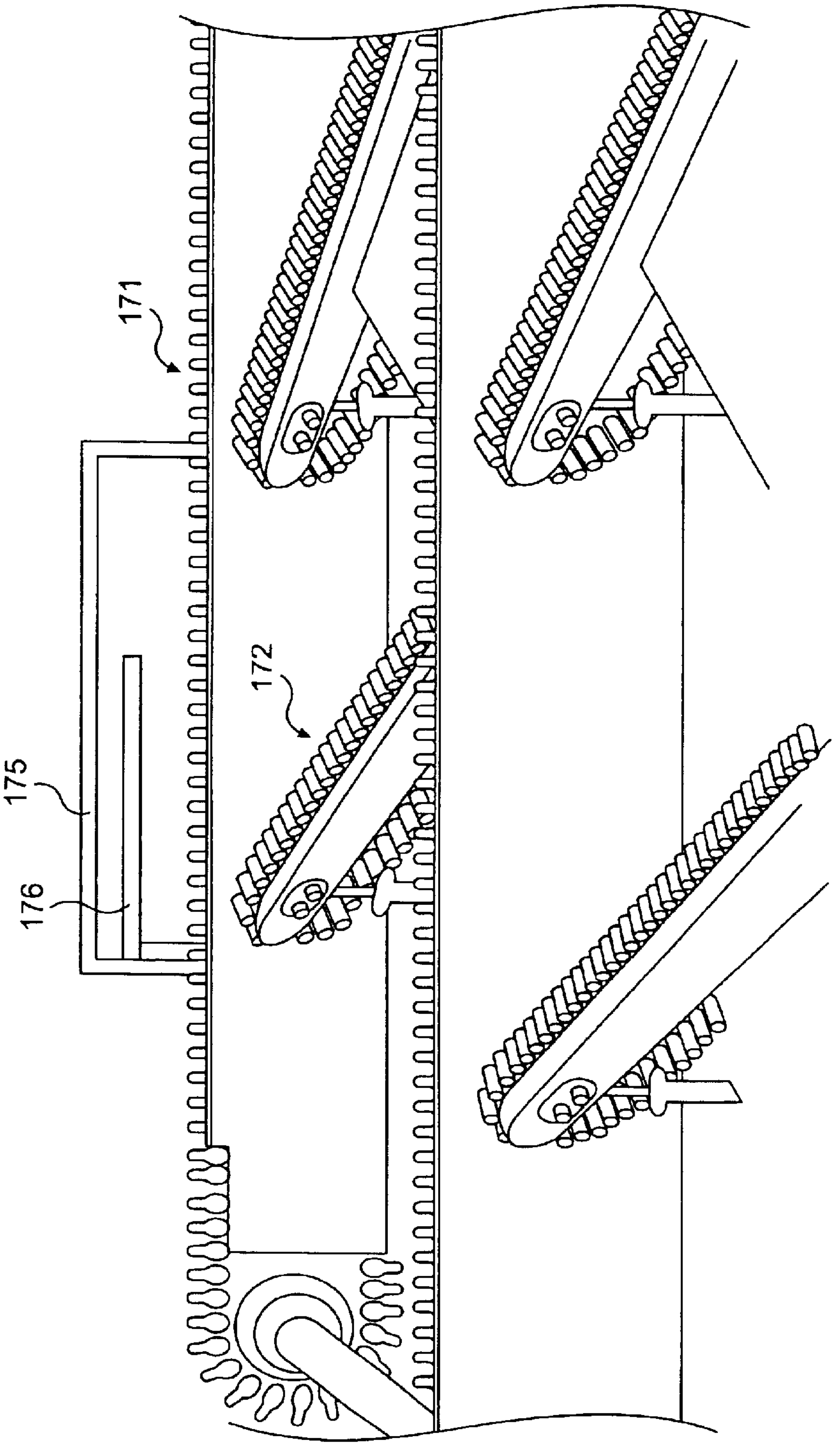
FIG. 13 is an elevated perspective of the reroute track system used on the lower conveyor system.

Trays move from the beam pass conveyor 200 to the back end 185 of the transport conveyor 180. The back end 185 of the transport conveyor 180 moves at a faster rate of speed than the beam pass conveyor 200 ensuring that no backward jostling of trays are caused by trays exiting the beam pass conveyor 200. Trays are conveyed along the back end 185 of the transport conveyor 180 to the reroute junction 171 and directed by a reroute chain 172, illustrated in FIG. 13 to either the exit conveyor 170 or back to the transport conveyor 180 via a reroute track 173 for another pass under the electron beam 12. The reroute junction 171 has a diverter 175 and a diverting rod 176. The diverting rod 176 rotates laterally and operates to assist the reroute chain in changing the direction of a tray. The reroute track 181 is a section of the transport conveyor 180 that completes the process loop 150.

Trays requiring multiple treatments are rerouted under the beam as required. Additionally, trays usually require cooling before leaving the lower level. Cooling is achieved by circulating the processed trays around the process loop with the electron beam turned off. When the trays have been processed and/or have sufficiently cooled they are directed to the outlet conveyor 170 and raised to the upper level 50 via the elevator 142.

The two level system described in FIG. 1 is the preferred embodiment. Other embodiments, however, are possible. For example, an irradiation system that has three levels may be configured. In a three level system, the irradiation source may be positioned on the middle level with a horizontally extending beam path, an upwardly extending beam path, and a downwardly extending beam path. As in FIG. 1, each level would have a conveyor system for passing articles through their respective beam paths.

Figure 14:
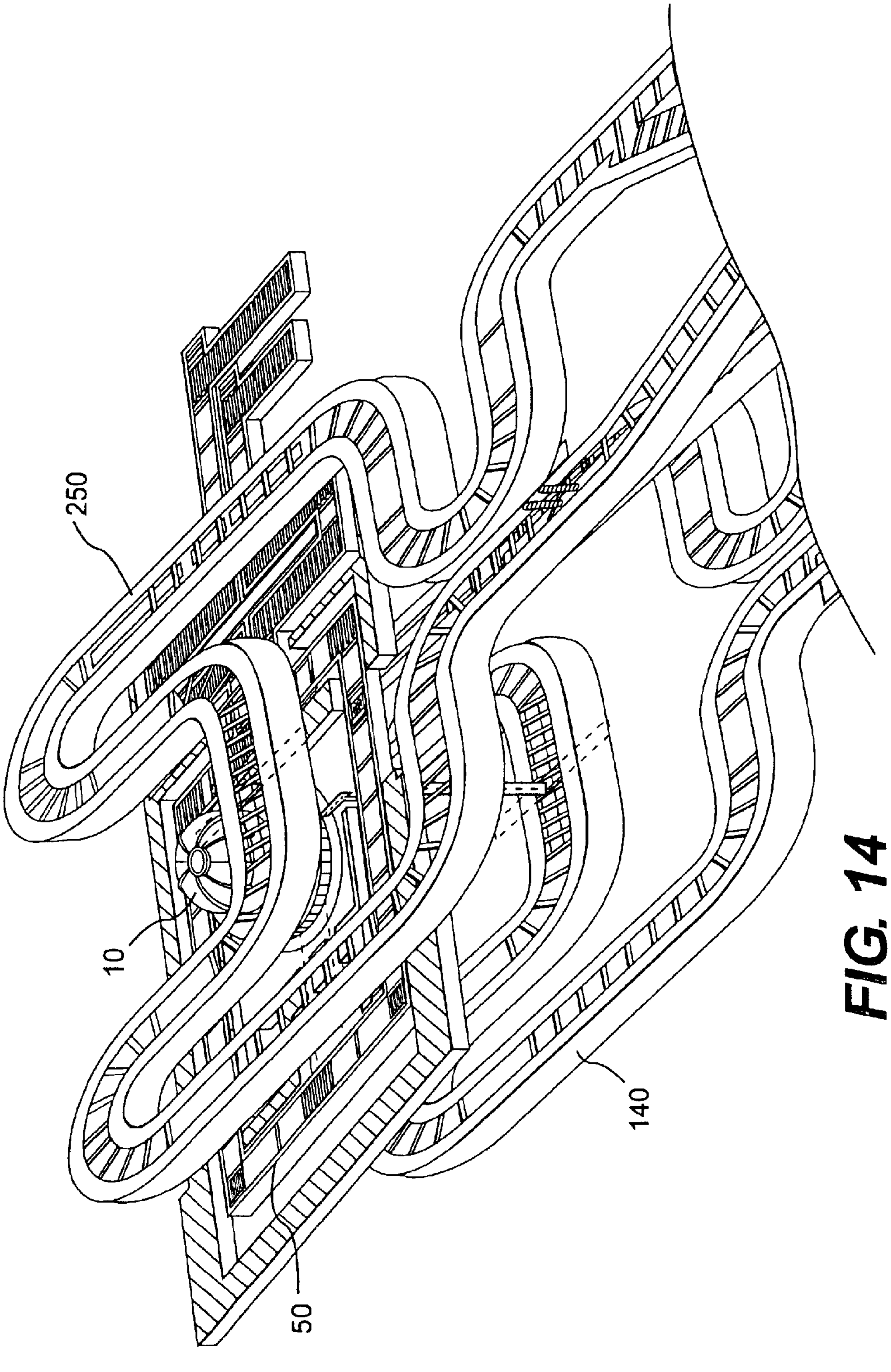
FIG. 14 is an elevated perspective of a triple conveyor system made in accordance with the invention.

FIG. 14 shows a three level system. In this system, trays radiated from the top in the lower conveyor system 140 may then be conveyed to a third conveyor system 250 and radiated from below. The beam pass conveyor of the upper level must either have a gap for allowing the beam to pass in between, or be of the suspension type where the beam can reach the articles from below.

What is claimed is:

1. An irradiation system comprising:

a radiation source having at least one beam path; and a conveyor system for transporting articles through the beam path, where the conveyor system has an entrainment conveyor adjacent to a beam pass conveyor and the entrainment conveyor precedes the beam pass conveyor and travels at a faster rate of speed than the beam pass conveyor, and where the combination of the slower beam pass conveyor and faster entrainment conveyor causes the articles to contact one another and upon contact, the articles to slow down but to continue to move forward so that there are no gaps between articles on the beam pass conveyor.

2. The irradiation system of claim 1 where the beam pass conveyor comprises a flat top chain for bearing articles.

3. The irradiation system of claim 1 where said articles are totes that contain product to be irradiated.

4. The irradiation system of claim 1 where said articles are trays that contain product to be irradiated.

5. The irradiation system of claim 1 where the beam pass conveyor comprises two parallel stainless steel extended pin chains for capturing and bearing totes and/or trays.

6. An irradiation system comprising: a radiation source having at least one beam path; a conveyor system for transporting articles through the beam path, where the conveyor system has an entrainment conveyor adjacent to a beam pass conveyor and the entrainment conveyor precedes the beam pass conveyor and travels at a faster rate of speed than the beam pass conveyor, and where the combination of the slower beam pass conveyor and faster entrainment conveyor causes the articles to contact one another and, upon contact, the articles to slow down but continue to move forward; and a gap fault switch linked to the irradiation source where the gap fault switch senses gaps between adjacent articles as a function of time and signals the radiation source to shut off for a time corresponding to the time between adjacent articles.

7. An irradiation system comprising: a radiation source having at least one beam path; a conveyor system for transporting articles through the beam path, where the conveyor system has an entrainment conveyor adjacent to a beam pass conveyor and the entrainment conveyor precedes the beam pass conveyor and travels at a faster rate of speed than the beam pass conveyor, and where the combination of the slower beam pass conveyor and faster entrainment conveyor causes the articles to contact one another and, upon contact, the articles to slow down but continue to move forward; and a control device for adjusting beam strength in response to changes in speed of the beam pass conveyor so that consistent dose delivery is achieved.

8. The irradiation system of any one of claims 1, 6 and 7 where the beam pass conveyor transports articles through the beam path on a continuous chain.

9. The irradiation system of any one of claims 1, 6 and 7 where the entrainment conveyor comprises a roller flight chain containing high rollers.

10. The irradiation system of any one of claims 1, 6 and 7 further comprising an active rotation device for rotating articles.

11. The irradiation system of any one of claims 6 and 7 where the entrainment conveyor positions articles on the beam pass conveyor so there are no gaps between articles on the beam pass conveyor.

* * * * *